April 23, 1935. J. L. CLARK ET AL 1,999,122
DEVICE FOR APPLYING AN INSECT DESTROYER AND/OR REPELLENT TO DOMESTIC ANIMALS
Filed Jan. 27, 1933   3 Sheets-Sheet 1

Inventors:
Jesse Lewis Clark,
Newton Mansfield,
By Spear, Duncan & Hall
Attorneys April 23, 1935.　　　　J. L. CLARK ET AL　　　　1,999,122
DEVICE FOR APPLYING AN INSECT DESTROYER AND/OR REPELLENT TO DOMESTIC ANIMALS
Filed Jan. 27, 1933　　　3 Sheets-Sheet 2
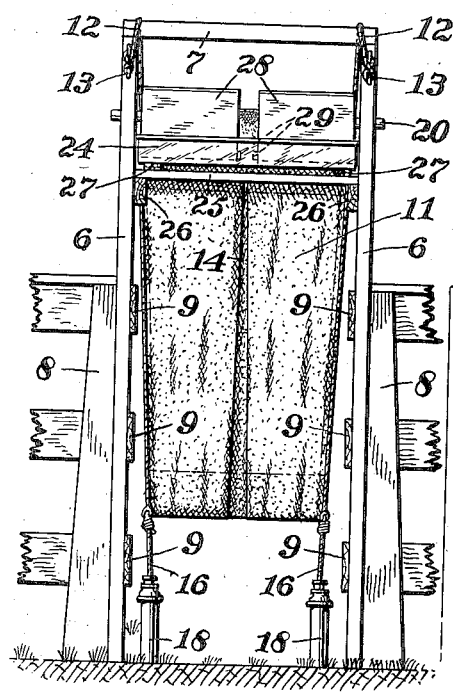
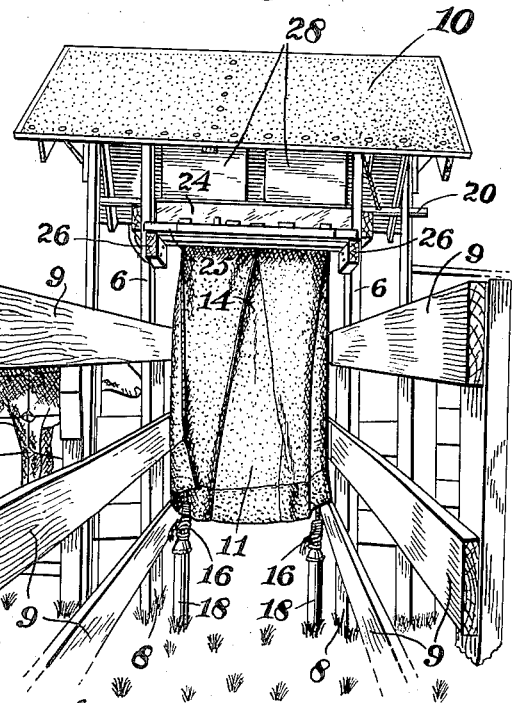
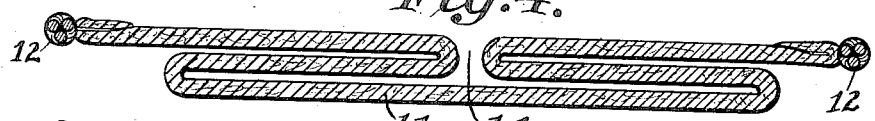
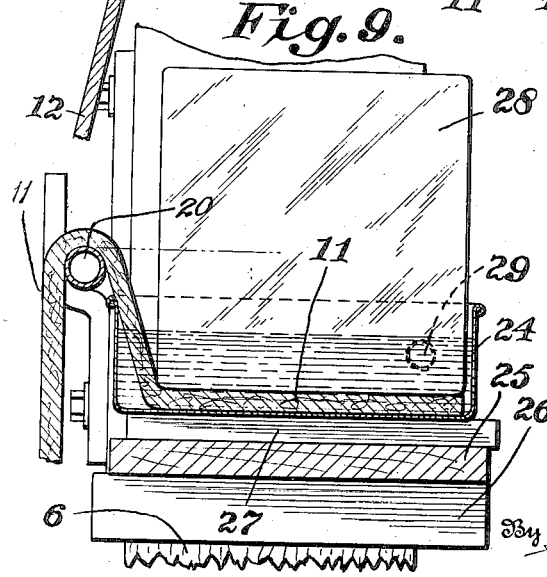
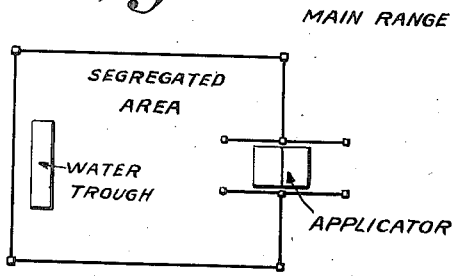
Inventors:
Jesse Lewis Clark,
Newton Mansfield,
By Spear, Donaldson + Hull
Attorneys.

April 23, 1935.   J. L. CLARK ET AL   1,999,122
DEVICE FOR APPLYING AN INSECT DESTROYER AND/OR REPELLENT TO DOMESTIC ANIMALS
Filed Jan. 27, 1933   3 Sheets-Sheet 3

Inventors:
Jesse Lewis Clark,
Newton Mansfield,
By Spear, Donaldson & Hall
Attorneys.

Patented Apr. 23, 1935

1,999,122

UNITED STATES PATENT OFFICE 1,999,122

DEVICE FOR APPLYING AN INSECT DESTROYER AND/OR REPELLENT TO DOMESTIC ANIMALS

Jesse L. Clark and Newton Mansfield, Ashland, Ohio, assignors to Dr. Hess & Clark, Inc., Ashland, Ohio, a corporation of Ohio Application January 27, 1933, Serial No. 653,914

19 Claims. (Cl. 119—157)

This invention relates to an apparatus for the application of liquid insect destroyer or repellent to domestic animals, particularly those animals which roam a grazing range and which it would be difficult, if not impossible, to treat individually by manual means. The purpose of this invention is to provide an apparatus which will be automatic in its operation and which will maintain the animals in a treated condition.

It is well known that animals on pasture during fly season are subject to considerable torment by the flies unless protected by some means. To rid themselves of the pests they are continually brushing against some object or attempting to run in order to rid themselves of the pests. The problem is easily met when the cattle are brought into the stable each evening for at that time they may be sprayed with a suitable liquid.

An object of this invention is the provision of an apparatus which will cause the animal to treat himself with the liquid insecticide at more or less frequent intervals.

Another object of the invention is the provision of an apparatus which will apply the liquid to nearly the entire body of the animal and thus increase its defensive value.

Another object is the provision of means for causing a firm wiping effect on the animal's body by the applicator.

Another object is the provision of means for insuring that each animal will be individually and completely treated with the liquid.

Another object is the provision of means for adjusting the position of the applicator as most suitable for the particular animals being treated.

A further object of the invention is the provision of means whereby the degree to which the applicator is supplied with liquid may be varied.

A still further object of the invention is the location of the apparatus where it will cause a regularly recurrent application of the liquid to the animals.

Other objects will appear from the following description taken in conjunction with the accompanying drawings in which:

Fig. 3 is a rear elevation of the apparatus.

Fig. 4 is a section on the line 4—4 of Fig. 1.

Fig. 5 is a view of the wiping member as mounted in actual operation.

Fig. 8 is a plan showing one possible location of the apparatus.

Fig. 9 is an enlarged cross-section of the liquid tank and associated parts taken on the line 2 of Fig. 1.

Figure 1:
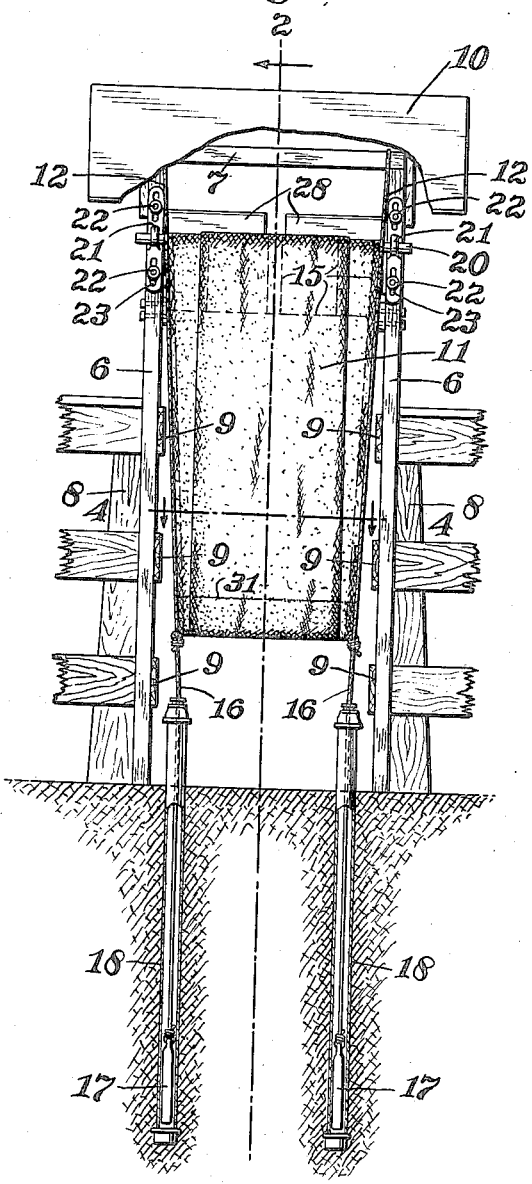
Fig. 1 is a front elevation of the apparatus.
Figure 2:
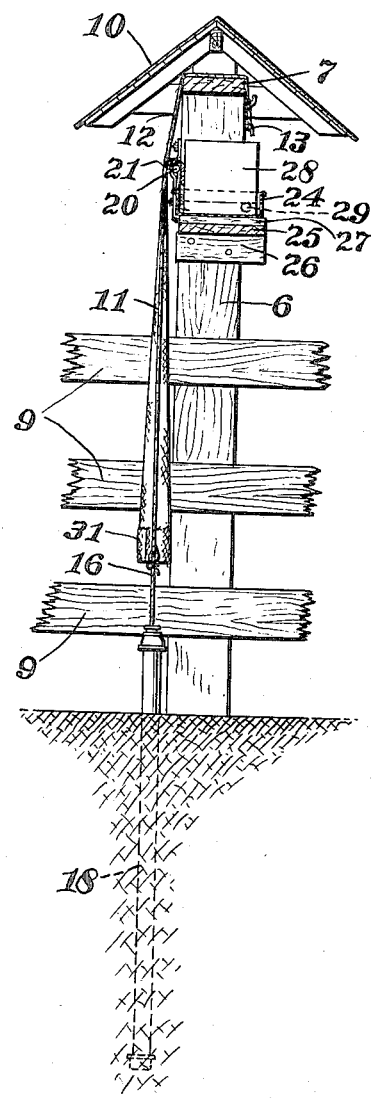
Fig. 2 is a section of the apparatus, on the line 2 of Fig. 1.
Figure 10:
Fig. 10 is an enlarged fragmentary sectional view of the blanket of Fig. 2 showing the absorbent material contained in the lower hem.

The frame of the apparatus is formed by the standards 6—6 and the cap-beam 7, the standards being supported in an upright position by the embedded fence posts 8—8. Guide bars 9—9 leading to and from the opening in the frame, form a passageway which insures that the animal will travel in a straight direction. The standards and the guide bars are preferably spaced apart slightly greater than the width of the animal which is to be treated with the liquid insecticide so that only one may pass at a time. The apparatus is protected from the weather, as here shown, by the roof 10 provided at the top of the standards.

Supported at the opening in the frame is a liquid insecticide applying member. In the particular device illustrated by the drawings to show the principle of the invention, this member is a blanket 11 made preferably of wool. It will be understood that the specification and drawings in this respect are illustrative and not restrictive on the scope of the invention and it will also be understood that the term "blanket" is used for convenience and is intended to include any flexible sheet material having liquid absorbing qualities which will conform to the shape of an animal passing under it and which will deliver liquid insecticide to the animal's body.

The blanket may be supported at the opening by ropes 12—12 secured to the longitudinal sides of the blanket and passing over the cap-beam 7 to the cleats 13—13 on the standards 6—6, to which the ropes are belayed. This arrangement facilitates vertical adjustment of the blanket as required by the size of the animals to be treated. A portion of the upper end of the blanket is free from the ropes to serve as a wick for the application portion, as will hereinafter be described.

An important provision of this invention is the formation of the blanket into longitudinal plications of folds whereby, a blanket of greater breadth, when distended, than the width of the frame opening may be employed. In the particular embodiment shown, the blanket is folded upon itself to form a box plait 14 as best shown in Fig. 4, although the invention could be practiced equally as well by merely gathering the blanket across its width. The blanket may be retained in this shape by stitching as 15 at the upper portion of the blanket.

For best results the ropes are convergent downwardly so that the lower corners of the blanket are spaced a shorter distance apart than the width of the animal. This may be done by connecting the weighted ropes 16—16 to the two lower corners of the blanket or to the lower ends of the supporting ropes 12—12. The weights 17 connected to the lower ends of ropes 16—16 are longitudinally slidable within the guide tubes 18 which have a portion extending above the ground and are spaced apart the desired distance between the lower corners of the blanket. These weights produce a stress on the sides of the blanket while leaving the central portion unstressed, and also substantially resist or retard forward movement of the lower corners of the blanket with the animal. It will be apparent that in place of the weight and rope arrangement shown, springs or any other stressing means may be employed.

The upper portion of the blanket which is unattached to the ropes 12 is looped over the horizontal bar 20 which is supported by the vertically adjustable hooked plates 21 secured to the standards 6—6 by bolts 22 passing through the slots 23. This bar maintains the lower edge of the plaited blanket in a substantially horizontal plane and also permits raising and lowering of the loop portion of the blanket passing over it and the elevation of the lower edge above the ground.

The free upper end of the blanket lies within a pan 24, serving as a reservoir for the supply of liquid to the blanket by capillary attraction. This pan rests on a cross plate 25 supported within the frame by blocks 26 secured to the standards 6. Vertical adjustment of the pan 24 is permitted by the spacer blocks 27. The pan 24 is preferably sufficiently large to permit the usual container 28 in which the liquid insecticide is supplied, to be placed in the pan on its side nearest the opening 29. The liquid will run into the pan until the opening 29 is sealed by liquid, thus maintaining a constant liquid level within the pan.

It will be seen that the portion of the blanket lying within the liquid in the pan serves as a wick to supply the insecticide to the wiping portion of the blanket. The rate of this supply may be varied by changing the vertical distance between the liquid level in the pan 24 and the loop portion of the blanket passing over the bar 20, this vertical distance being indicated in Fig. 9, by the distance between the liquid level in the reservoir and the horizontal broken line extending to the right from the part 20. This may be done either by vertical adjustment of the bar or of the pan by means of blocks 27, or both. This adjustment is primarily based upon the number of cattle which will be treated by the particular apparatus. To increase the charge of liquid in the blanket, its lower edge may be enlarged as by being hemmed, and the inside of the hem be supplied with any suitable absorbent material as at 31. The larger amount of saturated material thus presented insures an adequate application of liquid.

The apparatus is preferably set up where it will periodically treat the animals on the range or where the animals habitually or ordinarily pass. This may be effected by locating it in a passageway between the main range and a small area set off from the range. This small area should contain some baiting means as water or food which will periodically induce the animal to pass through the apparatus and become treated. Since the apparatus is so designed that the animal will be treated irrespective of the direction in which he is passing through it, the animal will receive another application of the liquid in returning to the range from the restricted area. It is also contemplated by this invention that separate apparatuses may be employed for the entrance to and exit from the enclosed area, though it will be seen that the apparatus will operate equally well whether the animal is passing in one direction or the other.

Figure 6:
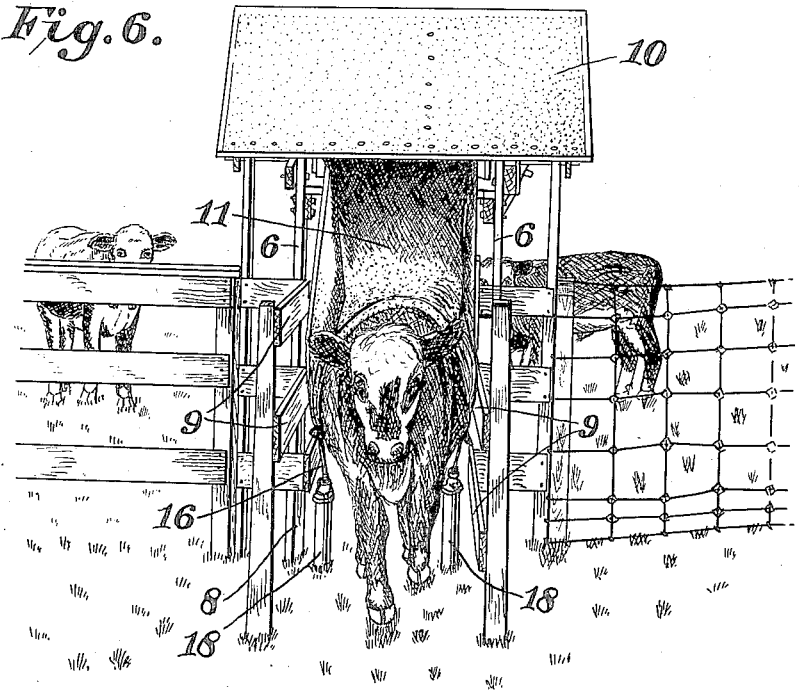
Fig. 6 is a view of the apparatus in use.
Figure 7:
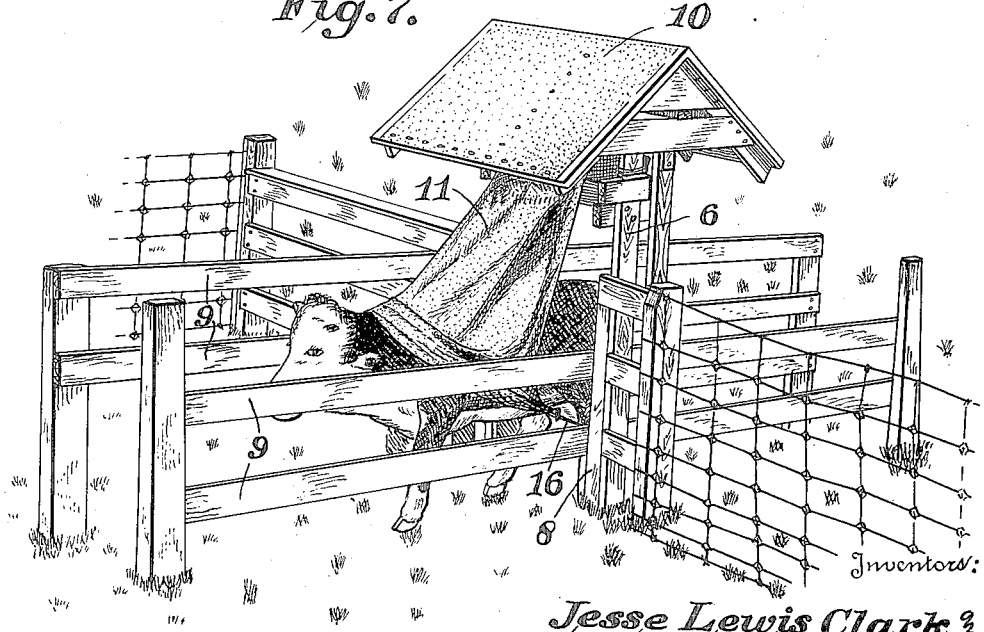
Fig. 7 is an angular view showing the apparatus in use.

The manner in which the blanket hangs suspended before the entrance of an animal is illustrated in Fig. 5 which shows the fold formation assumed by a plaited blanket. The animal, in passing under the blanket, first lifts it with his head after which the central portion of the blanket comes in contact with the neck, shoulders and the back of the animal. As this central portion is not stressed it readily yields upwardly as permitted by the spreading out of the plait, and is pulled tightly onto the animal's body by the weights or other stressing means at the sides of the blanket. This downward pull on the corners together with the fact that the corners are spaced closer together than the width of the animal results in an encircling of the major portion of the animal's body. Since the bottom edge of the blanket is continuous and substantially straight across or in the same horizontal plane throughout, not only the top but the lower side portions of the animal will be wiped with the liquid insecticide as the animal continues its forward movement through the apparatus. It will further be apparent that the backward pull exerted by the weights, assists in spreading out the plait of the blanket causing it to present a continuous lower wiping edge. If the blanket has the proper vertical adjustment within the opening the box plait when it unfolds will give the animal a wipe along its neck, its shoulders and its back, well down below the shoulders, along a large portion of the receding portion of its belly, and well down on its quarters nearly to the hock joints. This operation is shown in Figs. 6 and 7.

Where, in the following claims, the term "liquid" or "liquid insecticide" has been used, it is to be understood that these terms include any liquid which may either destroy or repel insects.

What is claimed is:

1. In an apparatus for the application of liquid insecticide to an animal, having an opening for the passage of an animal, a flexible member in sheet form depending across said opening substantially from one side thereof to the other, means for stressing the lower corner portions of said flexible sheet member downwardly while the central portion remains substantially free from stress, whereby upon passage of an animal the side portions of the flexible sheet member will closely conform to the sides of the animal, whereas the central portion will accommodate itself to the back of the animal.

2. In an apparatus for the application of liquid insecticide to an animal, having an opening for the passage of an animal, a flexible member in sheet form depending across said opening from one side thereof to the other and serving as an applicator, the actual width of said sheet member being greater than the distance from side to side of the hanging sheet member; means for stressing the lower corner portions of said flexible sheet member downwardly while the central portion remains with a fullness substantially free from stress, whereby upon passage of an animal the side portions of the flexible sheet member will closely conform to the sides of the animal whereas the central portion will spread and accommodate itself to the back of the animal.

3. In an apparatus for the application of liquid insecticide to an animal, having an opening for the passage of an animal, a flexible member in sheet form depending across said opening substantially from one side thereof to the other, and means for stressing the lower corner portions of said flexible sheet member downwardly and substantially restraining said lower corners from moving forward with the animal whereby upon passage of an animal the side portions of the flexible sheet member will closely conform to the sides of the animal, the central portion of said flexible sheet member being substantially free of stress to permit it to yield and accommodate itself to the back of the animal.

4. In an apparatus for the application of liquid insecticide to an animal, having an opening for the passage of an animal, a liquid applying blanket at said opening to engage the animal passing therethrough, liquid supply means for said blanket, and means including vertical guide members and cooperating weight elements connected to the lower corners of the blanket to cause the blanket to tightly engage the animal's body.

5. In an apparatus for the application of liquid insecticide to an animal, having an opening for the passage of an animal, a liquid applying blanket at said opening to engage the animal passing therethrough, liquid supply means for said blanket, and means for drawing the lower corners of the blanket downwardly and toward each other to cause the blanket to tightly contact with the top and lower side portions of the animal.

6. In an apparatus for the application of liquid insecticide to an animal, a frame having an opening for the passage of a single animal at a time, a liquid applying blanket within said opening to engage the animal passing therethrough, liquid supply means for said blanket, and yieldable means secured to the lower corners of the blanket and located inwardly of the frame and closer together than the greatest width of the animal to pull the blanket downwardly and inwardly along the lower side portions of the animal.

7. In an apparatus for the application of liquid insecticide to an animal, having an opening for the passage of an animal, a liquid applying blanket at said opening, and liquid supply means for said blanket, said blanket being plicated to reduce its extension in a horizontal direction when freely hanging and to permit it upon engagement with an animal to spread and encircle a substantial portion of its body.

8. In an apparatus for the application of liquid insecticide to an animal, having an opening for the passage of an animal, a liquid applying blanket at said opening and liquid supply means for said blanket, said blanket being folded upon itself along longitudinal lines to reduce its extension in a horizontal direction when freely hanging and being permanently held in that form by fastenings at the upper portion of the blanket, said folds permitting the blanket upon contact with an animal to spread and encircle a substantial portion of its body.

9. In an apparatus for the application of liquid insecticide to an animal, a frame having an opening for the passage of a single animal at a time, a vertically arranged liquid applying blanket within said opening, liquid supply means for said blanket, and stressing means for drawing the lower corners of the blanket downwardly and toward each other, said blanket having a greater width when distended than said opening and being plicated to bring its vertical sides along the sides of the opening, the folds permitting the central portion of the lower side of the blanket to yield upwardly and contact with the top side of the animal while the stressing means draw the lower end portions of the blanket inwardly into contact with the lower side portions of the animal.

10. In an apparatus for the application of liquid insecticide to an animal, having an opening for the passage and guidance of an animal, a vertically arranged liquid applying blanket at said opening to engage with an animal passing therethrough, said blanket being flexible so as to conform to and wipe the back and sides of an animal and liquid supply means for said blanket to maintain it in a saturated condition, the blanket having means disposed only at the lower end thereof and immediately above the wiping edge to provide an excess of the liquid at said lower end.

11. In an apparatus for the application of liquid insecticide to an animal, a frame having an opening for the passage of an animal, a liquid applying blanket within said opening for engagement with an animal passing therethrough, liquid supply means for said blanket, and supporting means for said blanket including a pair of rope members secured along the longitudinal sides of the blanket, the top ends of said rope members extending free of the blanket and being fastened to said frame and the lower ends of said rope members extending free of the blanket and being attached to yielding means tending to maintain said rope members taut.

12. In an apparatus for the application of liquid insecticide to an animal, a frame having an opening for the passage of a single animal at a time; a pair of rope members lying substantially within said opening and adjacent to the side walls of the opening, stressing means for drawing the lower ends of said blanket downwardly and toward each other; a blanket supported at said opening by attachment along its longitudinal sides to said rope members, the convergence of said rope members causing the lower ends of said blanket to contact with the lower side portions on an animal passing through said opening; and means for supplying liquid to the blanket.

13. In an apparatus for the application of liquid insecticide to an animal, a frame having an opening for the passage of a single animal at a time; a pair of rope members lying substantially within said opening and adjacent to the side walls of the opening, said rope members being convergent toward each other downwardly; yielding means for drawing the lower ends of said blanket downwardly; a blanket supported at said opening by attachment along its longitudinal sides to said rope members, said blanket being folded along longitudinal lines to permit the central portion of the lower side to yield upwardly and contact with the top portion of an animal passing through said opening, the convergence of said rope members and said yielding means causing the lower ends of said blanket to contact with the lower side portions of the animal; and means for supplying liquid to the blanket.

14. In an apparatus for the application of liquid insecticide to an animal, a frame having an opening for the passage of a single animal at a time, a liquid applying blanket within said opening to engage the animal passing therethrough, said blanket being folded to reduce its extension in a horizontal direction, liquid supply means for said blanket, yielding means secured to the lower corners of the blanket and spaced closer together than the greatest width of the animal for urging the lower corners downwardly, and guide means spaced apart substantially the width of the animal and forming a passageway leading to and from said frame opening to insure a straight passage of the animal therethrough.

15. An apparatus for applying insecticide to an animal comprising a structure having a passageway for the animal, a sheet of liquid absorbent material suspended across said passageway from side to side thereof and having its lower edge normally non-complementary in respect to the transverse shape of the back and sides of the animal, but conformable thereto upon contact of the animal therewith, and means for substantially restraining the lower corner portions of the sheet of flexible material from freely lifting or moving forward with the animal while leaving the central lower portion of said sheet free to rise and move forwardly upon contact of the forwardly moving animal therewith.

16. An apparatus for applying insecticide to an animal comprising a structure having a passageway for the animal, a sheet of liquid absorbent material suspended across said passageway from side to side thereof and having its lower edge lying in substantially a horizontal plane and normally non-complementary in respect to the transverse shape of the back and sides of the animal, but conformable thereto upon contact of the animal therewith, and means for substantially restraining the lower corner portions of the sheet of flexible material from lifting or moving forward with the animal while leaving the central lower portion of said sheet free to rise and move forwardly upon contact of the forwardly moving animal therewith.

17. An apparatus according to claim 8 in which the plications are substantially vertical plaits.

18. In an apparatus for the application of liquid insecticide to an animal, said apparatus having an opening for the passage and guidance of an animal, a vertically arranged liquid applying blanket at said opening to engage with an animal passing therethrough, liquid supply means for said blanket to maintain it in a saturated condition, the lower end of said blanket being folded upon itself and secured in that position to form a hem, and a filler including absorbent material enclosed within said hemmed end to collect an excess of the liquid, said hemmed end presenting a continuous lower edge lying substantially in a single horizontal plane.

19. In apparatus of the class described, a frame having an opening for the passage of an animal, an applicator of flexible material plicated vertically and extending across said opening in the pathway of the animal, means for downwardly stressing said applicator at its portions adjacent the opposite sides of the opening and means for feeding liquid to the applicator to be applied thereby to the animal.

JESSE L. CLARK.
NEWTON MANSFIELD.